United States Patent
Qian et al.

(10) Patent No.: US 11,164,092 B2
(45) Date of Patent: *Nov. 2, 2021

(54) PARALLEL TIME SERIES ANALYSIS

(71) Applicant: Pivotal Software, Inc., Palo Alto, CA (US)

(72) Inventors: Hai Qian, Mountain View, CA (US); Caleb E. Welton, Foster City, CA (US); Rahul Iyer, Foster City, CA (US); Shengwen Yang, Beijing (CN); Xixuan Feng, Palo Alto, CA (US)

(73) Assignee: Pivotal Software, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/741,458

(22) Filed: Jan. 13, 2020

(65) Prior Publication Data

US 2020/0285973 A1 Sep. 10, 2020

Related U.S. Application Data

(63) Continuation of application No. 14/278,537, filed on May 15, 2014, now Pat. No. 10,535,008.

(51) Int. Cl.
 *G06N 5/04* (2006.01)
(52) U.S. Cl.
 CPC ..................... *G06N 5/04* (2013.01)
(58) Field of Classification Search
 CPC ........................................................ G06N 5/04
 See application file for complete search history.

(56) References Cited

U.S. PATENT DOCUMENTS 6,574,587 B2 6/2003 Waclawski
8,090,709 B2 1/2012 Liu et al.
(Continued)

FOREIGN PATENT DOCUMENTS

WO WO 2013/071414 5/2013

OTHER PUBLICATIONS

Chen et al., "Multi-Dimensional Regression Analysis of Time-Series Data Streams", Proceedings of the 28th VLDB Conference, Hong Kong, China, 2002 (Year: 2002).*
(Continued)

*Primary Examiner* — Tsu-Chang Lee
(74) *Attorney, Agent, or Firm* — Fish & Richardson P.C.

(57) ABSTRACT

Methods, systems, and apparatus, including computer programs encoded on computer storage media, for parallel time series analysis. One of the methods includes receiving a plurality of data elements. The plurality of data elements are partitioned into a plurality of chunks, wherein the plurality of chunks, including a first chunk and a plurality of additional chunks, have an ordering according to the data elements included in each chunk. Each chunk is assigned to a particular segment of a plurality of segments. A first iteration of an autoregressive integrated moving average is computed for each chunk assigned to each segment. A second iteration of the autoregressive integrated moving average is computed for each chunk assigned to each segment, wherein computing uses the result data for a corresponding preceding chunk in the first iteration. One or more additional iterations of the autoregressive integrated moving average are computed until stopping criteria has been satisfied.

21 Claims, 4 Drawing Sheets

(56) References Cited

U.S. PATENT DOCUMENTS

| | | |
|---|---|---|
| 8,694,635 B1 | 4/2014 | Anand et al. |
| 2009/0006326 A1 | 1/2009 | Liu et al. |
| 2009/0018798 A1* | 1/2009 | Dorneich ........... G06Q 30/0202 |
| | | 702/179 |
| 2014/0324743 A1 | 10/2014 | Lakshiminarayan et al. |
| 2015/0032674 A1 | 1/2015 | Cichosz et al. |
| 2015/0134315 A1 | 5/2015 | Sarmiento et al. |

OTHER PUBLICATIONS

Barreto et al., "Time Series Prediction with the Self-Organizing Map: A review", Perspective of Neural-Symbolic Integration, B. Hammer, P.Hitzler Editors, Springe Verlag, 2007, p. 135-158 (Year: 2007).*

Chen et al., "Multi-Dimensional Regression Analysis of Time-Series Data Streams," Proceedings of the 28th VLDB Conference, Hone Kong, China, 2002.

Vorontsov et al Adaptive phase-distortion correction based on parallel gradient-descent optimization, Optics Letters, vol. 22, No. 12, Jun. 15, 1997.

* cited by examiner

US 11,164,092 B2

PARALLEL TIME SERIES ANALYSIS

CROSS-REFERENCE TO RELATED APPLICATIONS

This application is a continuation application of U.S. patent application Ser. No. 14/278,537, filed May 15, 2014, which is incorporated herein in its entirety.

BACKGROUND

This specification relates to time series analysis.

Time series analyses are important in many fields including, for example, econometrics, finance, weather forecasting, stock price forecasting, and earthquake prediction. One example time series model is autoregressive integrated moving average ("ARIMA"). Autoregressive integrated moving averages can be fitted to time series data to better understand the data or to predict future points in the series. The model typically includes three parameters that refer to the order of the autoregressive, integrated, and moving average parts of the model.

SUMMARY

This specification describes technologies relating to parallel time series analysis.

In general, one innovative aspect of the subject matter described in this specification can be embodied in methods that include the actions of receiving a plurality of data elements; partitioning the plurality of data elements into a plurality of chunks, wherein the plurality of chunks, including a first chunk and a plurality of additional chunks, have an ordering according to the data elements included in each chunk; assigning each chunk to a particular segment of a plurality of segments, wherein each segment comprises a computing resource and a database storing data elements; and computing an autoregressive integrated moving average for the plurality of data elements comprising: computing a first iteration of an autoregressive integrated moving average for each chunk of the plurality of chunks assigned to each segment using specified initial conditions; storing first iteration result data for each chunk of the plurality of chunks; computing a second iteration of the autoregressive integrated moving average for each chunk of the plurality of chunks assigned to each segment, wherein computing the autoregressive integrated moving average for each of the additional chunk uses the result data for a corresponding preceding chunk in the first iteration; determining whether stopping criteria has been satisfied; and computing one or more additional iterations of the autoregressive integrated moving average for each chunk of the plurality of chunks until the stopping criteria has been satisfied.

These and other embodiments can each optionally include one or more of the following features. Computing an iteration of an autoregressive integrated moving average for each chunk of the plurality of chunks assigned to each segment comprises: computing an iteration of an autoregressive integrated moving average for each chunk of the plurality of chunks assigned to each segment in parallel. Computing an iteration of an autoregressive integrated moving average for each chunk of the plurality of chunks assigned to each segment comprises: computing an iteration of an autoregressive integrated moving average for the plurality of chunks assigned to each segment in parallel, wherein for each segment: computing an iteration of an autoregressive integrated moving average for each chunk of the plurality of chunks assigned to the segment sequentially. Result data includes a first parameter that identifies an autoregressive order, a second parameter that identifies an integrated order, and a third parameter that identifies a moving average order. Determining whether stopping criteria has been satisfied comprises determining whether result data of a particular chunk from an iteration of the additional iterations is more than a threshold greater than result data from the particular chunk from a different previous iteration, or determining whether a current number of iterations is equal to a maximum number of iterations. Each chunk is associated with a respective chunk identification number according to the ordering of the plurality of chunks, and the plurality of segments are associated with respective segment numbers. Assigning each chunk to a particular segment comprises: computing a segment number from a modulus of a chunk identification number associated with a chunk and a total number of the plurality of segments; and assigning the chunk to a segment associated with the segment number. The actions include computing a first iteration of an autoregressive integrated moving average for the chunk; and storing result data for the chunk in a result data structure, wherein the result data structure maps result data to respective chunk identification numbers. Computing the autoregressive integrated moving average for each of the additional chunk uses the result data for a corresponding preceding chunk; comprises: accessing the result data structure and identifying a chunk identification number associated with a chunk; obtaining result data mapped to the identified chunk identification number. The actions include determining a total number of the plurality of chunks from a memory size of each segment. The specific initial conditions comprise random values, or zero values. The actions include sorting the plurality of data elements by respective time value of each included data element; and partitioning the sorted plurality of data elements into a plurality of chunks. The actions include partitioning the plurality of data elements into a plurality of chunks by determining data elements to include in each chunk from respective time values of the plurality of data elements; and sorting, for each chunk in parallel, the data elements included in the chunk by respective time value of each included data element. Computing a second iteration of the autoregressive integrated moving average for a first chunk, and a second chunk subsequent to the first chunk comprises: computing a second iteration of the autoregressive integrated moving average for the second chunk using result data from the first chunk computed in a preceding iteration; and computing a second iteration of the autoregressive integrated moving average for the first chunk using result data from a preceding chunk computed in a preceding iteration, wherein computing a second iteration for the second chunk and computing a second iteration for the first chunk is performed in parallel.

Particular embodiments of the subject matter described in this specification can be implemented so as to realize one or more of the following advantages. An autoregressive integrated moving average can be performed efficiently on a distributed system by breaking up the data elements into a number of smaller groups so that each group can be computed in parallel on different nodes. Passing the result of each node in one iteration to a different node in a next iteration allows for parallelization and an increase in the speed of the analysis.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
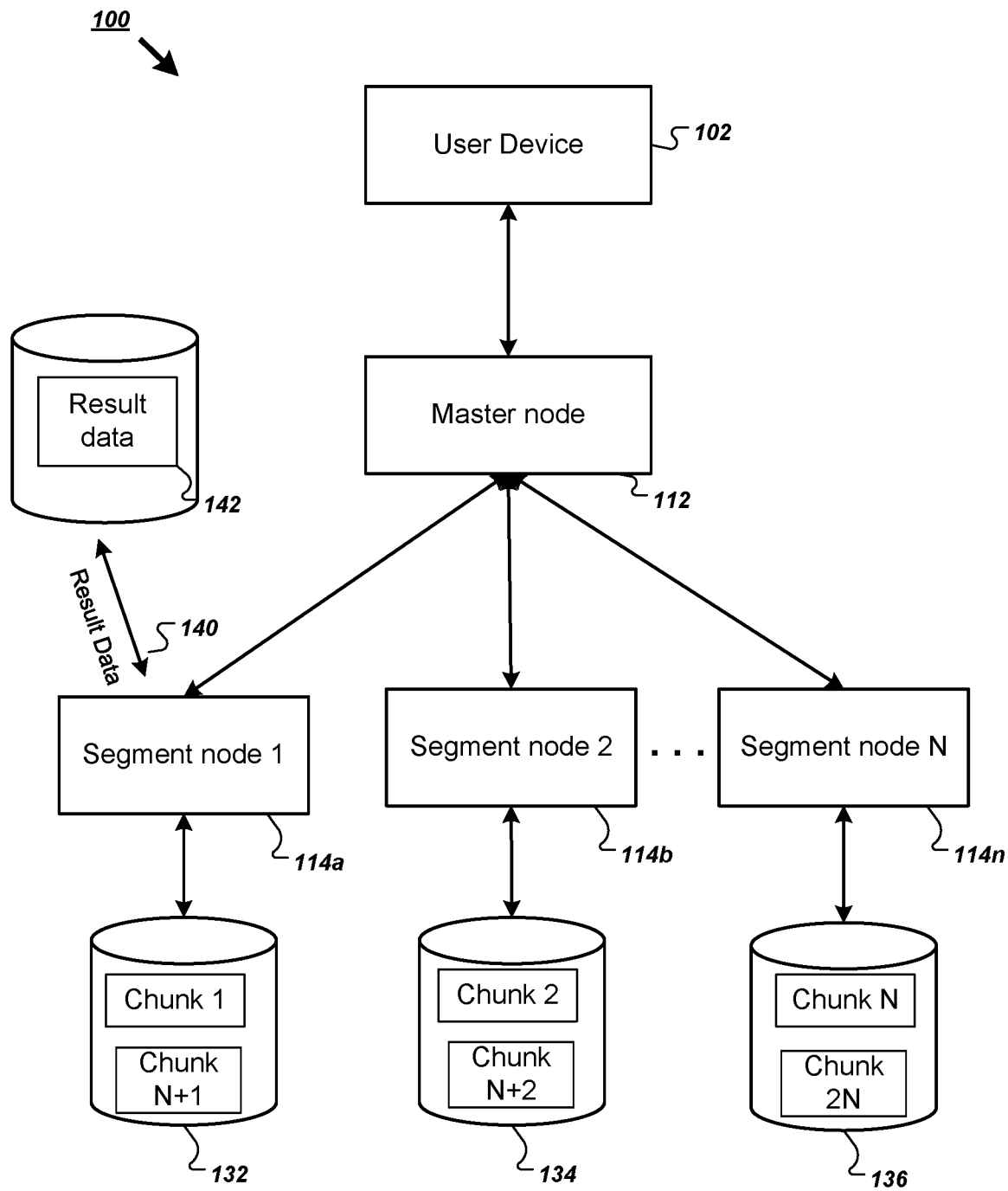
FIG. 1A is a diagram of an example distributed system.

FIG. 1A is a diagram of an example distributed system 100. The distributed system 100 is an example of a computing system that can be used to compute an autoregressive moving average.

The distributed system 100 includes a master node 112 and multiple segment nodes 114a, 114b, through 114n. The master node 112 and each segment node 114a-n are implemented as one or more physical computers or as software installed as a virtual machine on a physical computer. The master node 112 and the segment nodes 114a-n are communicatively coupled by one or more communications networks, e.g., a local area network or the Internet. The master node 112 assigns each segment node to operate on a portion of data stored in the distributed system 100.

Each data portion generally stores time series data elements sorted temporally, e.g., financial data, stock data, historical data of output production, or seasonal weather data that each have a temporal parameter e.g., date or date and time. The system 100 can include thousands or millions of data elements spread across the segment nodes, which are stored as chunks of temporally sorted data elements accessible to each segment node in storage subsystems. Thus, the master node 112 can divide the processing among N segment nodes, e.g., the segment nodes 114a-n. The segment nodes can access the data elements by communicating with data nodes in an underlying distributed storage system, for example, the Hadoop File System (HDFS). The data is generally partitioned among multiple storage devices and can be organized according to any appropriate key-value storage subsystem. For example, the data portions can be table partitions of a relational database distributed among multiple storage devices, e.g., as part of a massively parallel processing (MPP) database. The data portions can also be stored as part of a distributed, non-relational database, e.g., in a Hadoop Database (HBase) that organizes data by key-value pairs in distinct column families and distributed across multiple storage devices.

The master node 112 is configured to receive data elements, and optionally perform a sort on the data elements. The master node 112 then divides the data elements into contiguous ordered chunks, which are evenly spread across segment nodes, e.g., segment nodes 114a-n, such that each segment node includes one or more chunks. Each of the chunks are stored in respective storage subsystems, e.g., storage subsystems 132, 134, and 136. In some implementations, the master node 112 assigns each chunk to a segment node based on the sorted data included in each chunk, e.g., by placing subsequent chunks in subsequent segment nodes. A distributed system can include any suitable number of segment nodes that can operate on any suitable number of chunks. For instance, a distributed system 100 with N segment nodes, and 2N chunks, the master node 112 can assign the first segment node 114a to operate on chunk 1, e.g., a chunk containing the beginning of temporally sorted data elements and stored in a first storage subsystem 132. Similarly, the master node 112 can assign the second segment node 114b to operate on chunk 2, e.g., the chunk containing temporally sorted data elements directly after the first chunk's data elements and stored in a second storage subsystem 134. The master node 112 can assign the Nth segment node 114n to operate on chunk N stored in an Nth storage subsystem 136. After chunk N is assigned, the master node 112 can assign the first segment node 114a to operate on a subsequent chunk, e.g., chunk N+1. Similarly the second segment node 114b is assigned chunk N+2, and the Nth segment node 114n is assigned chunk 2N.

Each segment node performs, in parallel, iterations of an autoregressive integrated moving average on its respective one or more chunks. Upon completion of an iteration, each segment node stores result data for the respective chunks that include the computational result of the completed iteration and three sets of parameters that identify the order of the autoregressive, integrated, and moving average parts of the model, in a result data structure 142, e.g., a table or database. In the next iteration, a segment can access the result data structure 142 and obtain result data for a particular chunk from the previous iteration. Each segment node uses result data from the previous iteration to operate on the respective chunks for that segment node. Additionally, the result data for each chunk is the result data of the preceding chunk in the order of the chunks, as described above. In some implementations, instead of each segment node providing result data to the result data structure 142, the result data 140 can be provided to the master node 112, which can store and retrieve the result data 140 from the result data structure 142 each time a segment node starts or completes iteration.

For example, in a first iteration, a first segment node, e.g., segment node 114a, provides initial conditions, e.g., all zeroes or random data, to each of its chunks, and performs an autoregressive integrated moving average on its chunks. In parallel, the other segment nodes, e.g., segment nodes 114b and 114n, provide initial conditions, e.g., all zeroes or random data, to each of their respective chunks, and perform an autoregressive integrated moving average on its chunks. Each of the segment nodes, e.g., segment node 114a, 114b, and 114n, store result data 140 from their respective chunks, e.g., in a result data structure 142. Each segment node can perform the autoregressive integrated moving average on their respective chunks in parallel for the first iteration.

In the next iteration, the segment nodes, e.g., segment node 114a through 114n, can access the result data structure 142 to obtain result data from the chunks computed in the prior iteration. The segment nodes use the result data from preceding chunks in the prior iteration as inputs to their respective chunks. For example, to perform an autoregressive integrated moving average on chunk 5 in the order of chunks, the result data for chunk 4 in the previous iteration is obtained and used as input. Each segment node can perform the autoregressive integrated moving average on their respective chunks in parallel for the iteration. Thus, the first segment node, e.g., segment node 114a, can access the result data structure 142, and obtain result data from the first iteration performed on prior chunks, i.e., chunk N+1 uses result data from chunk N included on segment node 114n, and chunk 1 again uses initial conditions.

The result data structure 142 can include result data and respective chunk identifiers. For example, after a first iteration the result data structure 142 can include result data and a chunk identifier for a first chunk, and result data and a chunk identifier for a second chunk. For the second iteration, the segment node that includes the second chunk can then access the result data structure, obtain the result data for the first chunk, and compute the second iteration on the second chunk using the obtained result data. Computing an iteration of an autoregressive integrated moving average on a chunk is described below, with reference to FIG. 3.

Figure 1B:
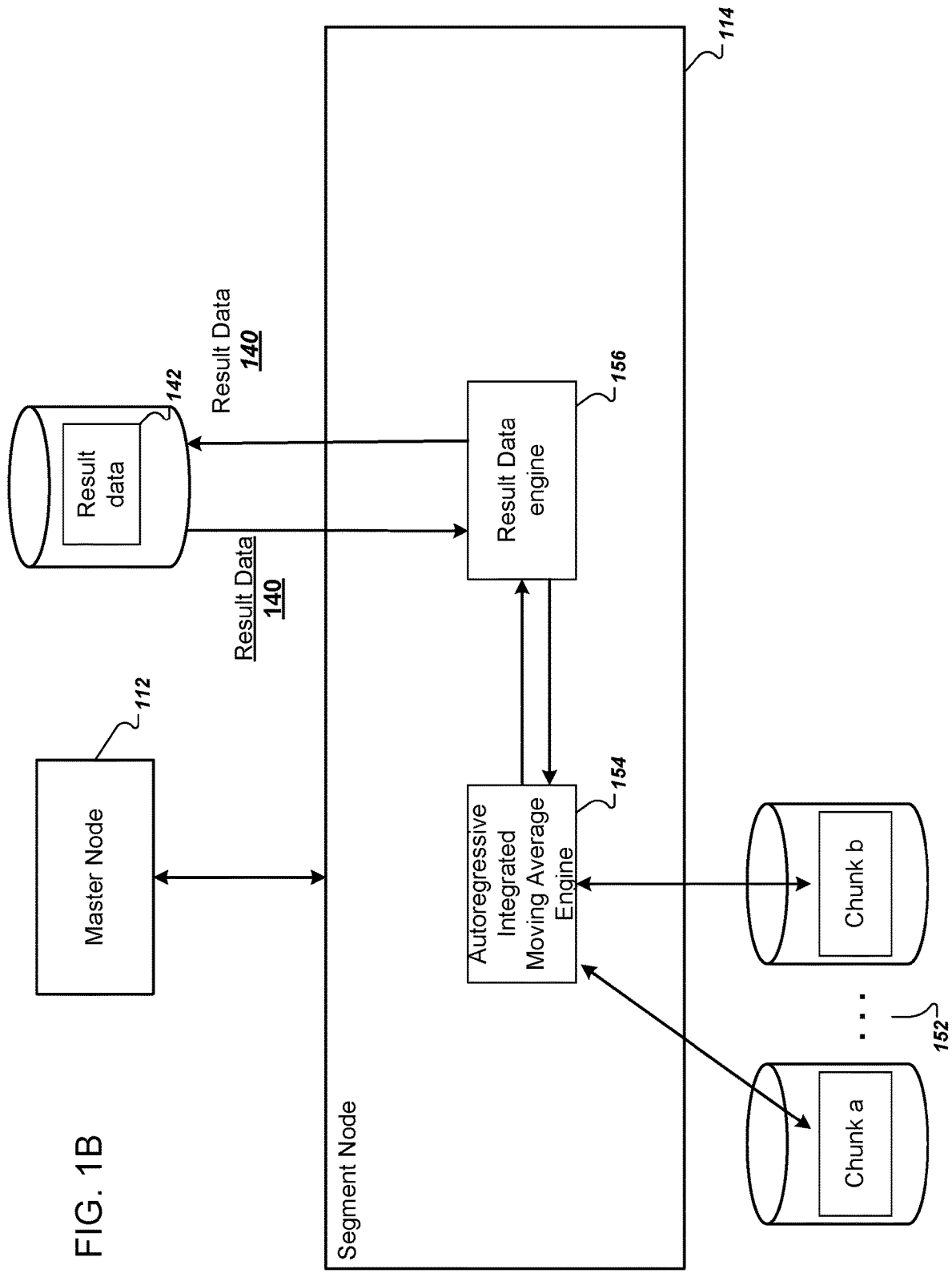
FIG. 1B is a diagram of an example segment node of the example distribution system of FIG. 1A.

FIG. 1B is a diagram of an example segment node 114 of the example distributed system of FIG. 1A. The segment node 114 can be one of the segment nodes 114*a-n* of FIG. 1A. The segment node 114 includes an autoregressive integrated moving average engine 154, and a result data engine 156.

The autoregressive integrated moving average engine 154 computes iterations of autoregressive integrated moving averages on each chunk, e.g., chunks a to b 152. The autoregressive integrated moving average engine 154 computes iterations of an autoregressive integrated moving average by obtaining result data 140 from chunks that are previous to chunks a to b 152, e.g., chunks a-1 to b-1, and using the obtained result data 140 as inputs to chunks a to b 152.

The result data engine 156 is configured to provide and receive result data 140 to and from a result data structure 142. After an iteration completes, the result data engine 156 provides result data 140 from each chunk 152 included in a segment node 114 to a result data structure 142. In some implementations, the result data 140 can be provided to the master node 112 for storage in a result data structure 142.

The master node 112 can be configured to control the overall autoregressive integrated moving average. For example, the master node 112 can provide a signal to each segment node to compute an iteration of an autoregressive integrated moving average. The master node 112 can then provide result data to subsequent chunks by obtaining result data from a result data structure. Furthermore the master node 112 can determine when the autoregressive integrated moving average has been completed and provide a result.

Figure 2:
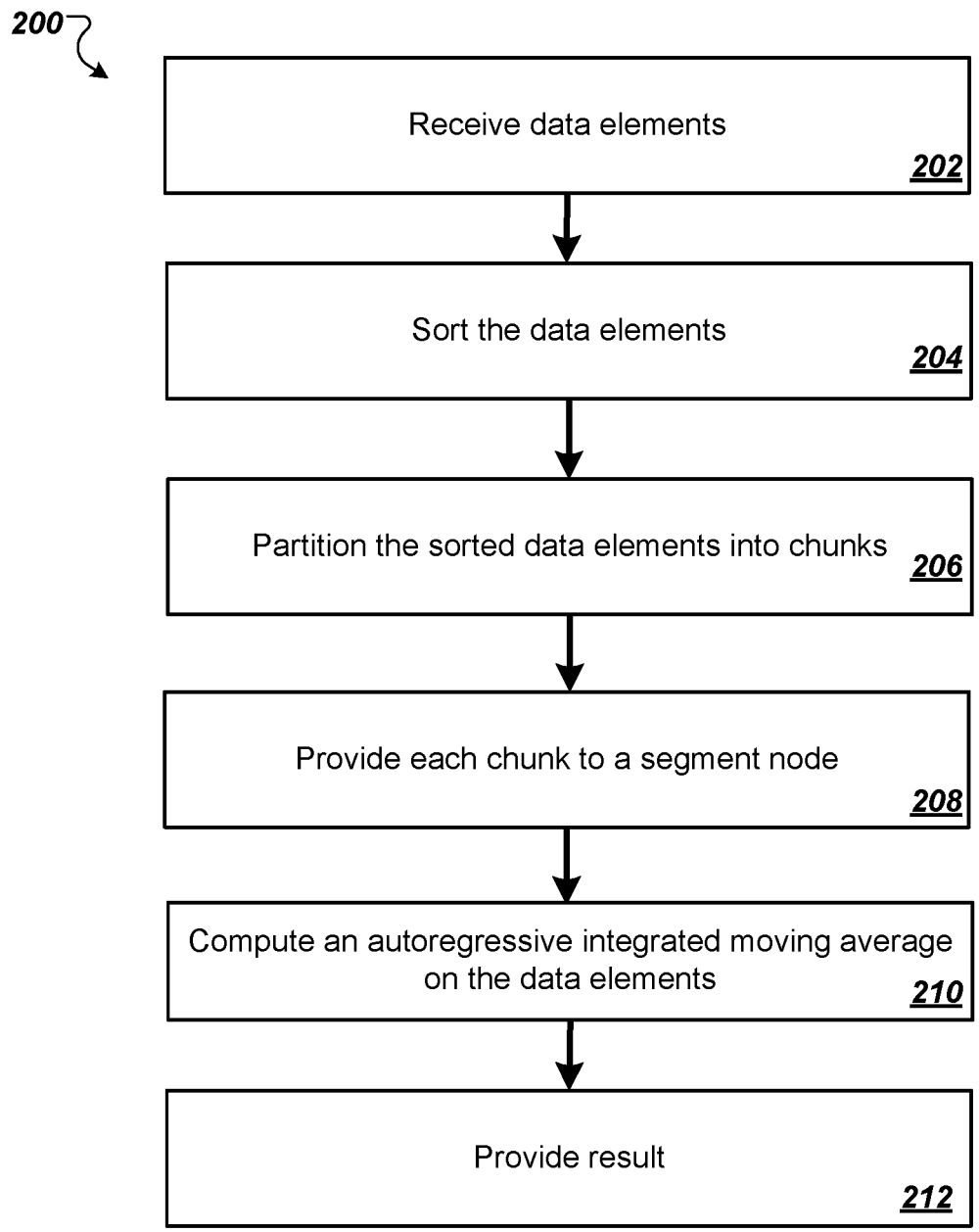
FIG. 2 illustrates an example process of performing an autoregressive integrated moving average.

FIG. 2 illustrates an example process 200 for performing an autoregressive integrated moving average on a distributed system. The process 200 will be described as being performed by a system of one or more appropriately programmed computers, e.g., the distributed system 100 of FIG. 1.

The system receives data elements (step 202). The data elements, can be, e.g., time series data of stocks, historical weather data, and so on, and can each be stored in the system as a data element value and a respective time value. The system can receive data elements from a user, e.g., a user can input data elements from another computer, upload data elements to the system, or a user can download data elements to the system from another computer over a network.

The system sorts the data elements (step 204). The system sorts the data elements according to respective time values of the data elements, i.e., the system places each data element in ascending order based on its respective time value. In some implementations, the system partitions the data elements into chunks first and then sorts the data elements in each chunk. Partitioning the data elements first is described below.

The system partitions the sorted data elements into chunks (step 206). The system determines a number of chunks to generate, which in some implementations can be a specified number inputted into the system. In some other implementations, the number of chunks depends on the size of the system, for example the system can determine the number of chunks from the number of segment nodes included in the system and the memory size available to each segment node. In some implementations, the system can be configured to determine the number of chunks so that each chunk can fit in memory available to each segment node.

Each chunk includes sorted data elements, so that the chunks have an ordering defined by the respective time values of the included data elements. Table 1 shows an example of three chunks and a time value for each included data element. In the example, the chunks have an ordering based on the time values of the data elements in the chunks, i.e., chunk 2 is subsequent to chunk 1, and chunk 3 is subsequent to chunk 2 and chunk 1.

TABLE 1

| Chunk 1 | Chunk 2 | Chunk 3 |
|---------|---------|---------|
| 1 | 8 | 14 |
| 3 | 10 | 15 |
| 4 | 11 | 17 |
| 7 | 12 | 20 |

In some other implementations, the system can partition the data elements into chunks first, and then sort the data elements in each chunk. The system partitions the unsorted data elements according to respective time values of each data element. That is, the system can determine data elements to include in each chunk by first partitioning the entire range of time values using the number of chunks, and assigning each partitioned range of time values to a respective chunk. The system then identifies data elements with time values in each partitioned range of time values, and assigns the data element to corresponding chunks. For instance, if there are 4 chunks, and 100 data elements with time values that range from 0-99 milliseconds (ms), the system can assign a first range of time values to chunk 1, e.g., the range 0-24 ms, a second range of time values to chunk 2, e.g., 25-49 ms, a third range of time values to chunk 3, e.g., 50-74 ms, and a fourth range of time values to chunk 4, e.g., 75-99 ms. The system can then include the data elements with time values between 0-24 in chunk 1, 25-49 in chunk 2, 50-74 in chunk 3, and 75-99 in chunk 4.

In the above implementations, the system then sorts the data elements in each chunk in parallel.

After partitioning the data elements into chunks, the system assigns a respective chunk identification number to each data element.

The system assigns each chunk to a segment node (step 208). The system provides a roughly even number of chunks to each segment node, and determines which chunks to provide to each segment node. In some implementations, the chunks are distributed according to the formula:

$$Segment_j = Chunk\ mod(total\ number\ of\ segments)$$

$Segment_j$ is the jth segment that the ith chunk is provided to. The system determines the segment by taking the modulus of the current chunk identification number and the total number of segments.

The system computes an autoregressive integrated moving average on the data elements (step 210). The system computes iterations of the autoregressive integrated moving average on the chunks, and after the completion of each of the iterations provides the result data from each chunk to a subsequent chunk as input for the next iteration. Result data includes the computational result of the completed iteration and three sets of parameters that identify the order of the autoregressive, integrated, and moving average parts of the model. In some implementations, the system computes each chunk in a particular segment node at the same time, e.g., if a first segment node has three chunks, the system computes the three chunks in parallel. In other implementations the system computes each chunk in a particular segment node sequentially, e.g., if a first segment node has three chunks, the system loads the first chunk's data, computes an iteration and stores the result data, then loads the second chunk's data and computes an iteration, then the loads the third chunk's data and computes an iteration, and then starts a new iteration on the first chunk. Computing an iteration of an autoregressive integrated moving average on a chunk is described below, with reference to FIG. 3.

For example, the system can include three segment nodes with two chunks per segment node. Table 2 illustrates a first iteration of an autoregressive integrated moving average. The inputs to chunk 1 for all iterations are fixed initial conditions, e.g., all zeroes, random values, or user inputted values. The inputs to the remaining chunks for the first iteration are initial conditions, e.g., all zeroes, random values, or user inputted values. After the first iteration, the system can store result data from each chunk in a result data structure accessible to each segment node. The result data can be associated with a chunk identification number.

TABLE 2

First Iteration

| Segment Number | Input | Output |
|---|---|---|
| Segment 1 Chunk 1 | Fixed Initial Conditions | Chunk 1 result data |
| Segment 1 Chunk 4 | Initial Conditions | Chunk 4 result data |
| Segment 2 Chunk 2 | Initial Conditions | Chunk 2 result data |
| Segment 2 Chunk 5 | Initial Conditions | Chunk 5 result data |
| Segment 3 Chunk 3 | Initial Conditions | Chunk 3 result data |
| Segment 3 Chunk 6 | Initial Conditions | Chunk 6 result data |

The second iteration is shown in Table 3. In the second iteration, the input to chunk 1 remains the fixed initial conditions. For the remaining chunks, the system provides result data from each chunk, computed in the previous iteration, to a subsequent chunk, illustrated in Table 3. Each segment node in the system can obtain result data from the result data structure.

TABLE 3

Second Iteration

| Segment Number | Input | Output |
|---|---|---|
| Segment 1 Chunk 1 | Fixed Initial Conditions | Chunk 1 result data |
| Segment 1 Chunk 4 | Chunk 3 result data from first iteration | Chunk 4 result data |
| Segment 2 Chunk 2 | Chunk 1 result data from first iteration | Chunk 2 result data |
| Segment 2 Chunk 5 | Chunk 4 result data from first iteration | Chunk 5 result data |
| Segment 3 Chunk 3 | Chunk 2 result data from first iteration | Chunk 3 result data |
| Segment 3 Chunk 6 | Chunk 5 result data from first iteration | Chunk 6 result data |

The system computes iterations until a stopping criterion is reached. The system can determine whether the result data that includes the computational result of the completed iteration and the three sets of parameters have changed very little in the past one or more iterations. For example, the system can determine whether the result data has changed less than a threshold since the last iteration, e.g., less than $10^{-14}, 10^{-15}, 10^{-16}$. In some implementations the system can average the past several iterations. Alternatively or in addition, the stopping criteria can include determining that a specified maximum number of iterations has been reached.

Figure 3:
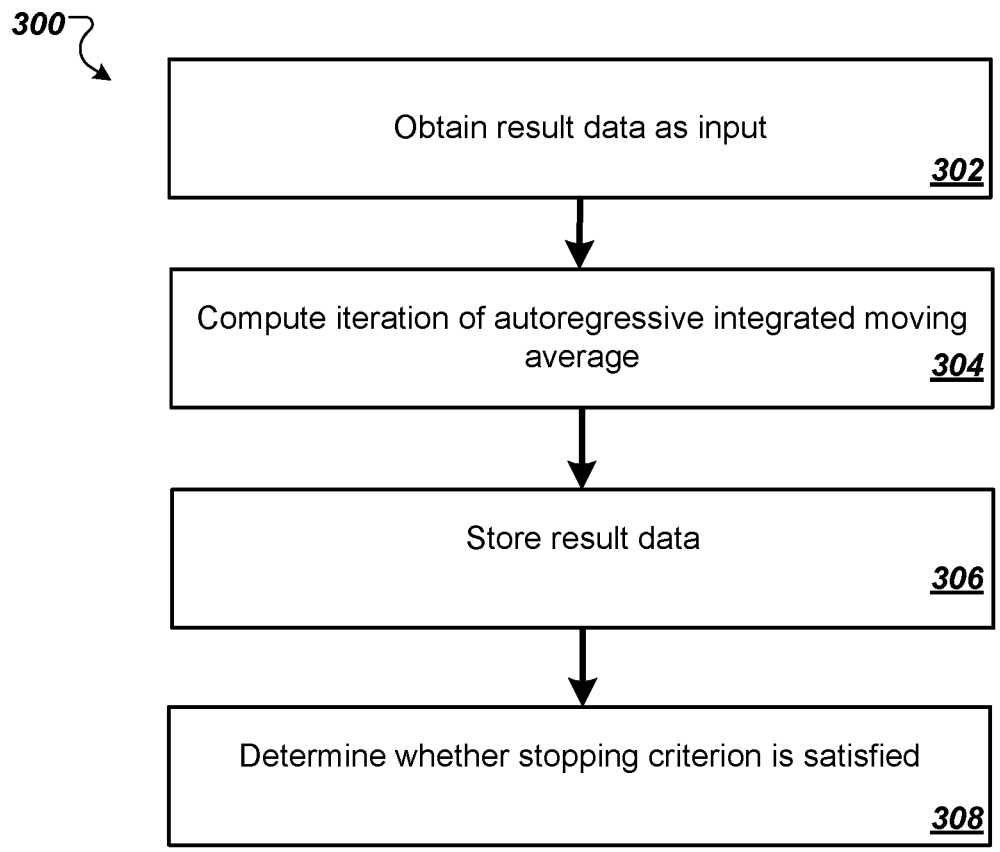
FIG. 3 illustrates an example process of computing an iteration of an autoregressive integrated moving average on a chunk.

FIG. 3 illustrates an example process 300 for computing an iteration of an autoregressive integrated moving average on a chunk. The process 300 will be described as being performed by a system of one or more appropriately programmed computers, e.g., the distributed system 100 of FIG. 1.

The system obtains result data from a prior iteration of an autoregressive integrated moving average on a prior chunk (step 302). The system can access a result data structure to obtain result data by identifying the prior chunk using a chunk identifier. For example, if the chunk identifier identifies the prior chunk as being chunk 3, the system can locate chunk 3 in the result data structure, and obtain mapped result data.

The system computes an iteration of an autoregressive integrated moving average (step 304). The chunk's time ordered data elements are stored as a lag difference in a vector or table:

$$Y_t = (1-B)^d (X_t - \mu),$$

$Y_t$ is the lag difference, B is a backshift operator, d is the order of the integrated part of the model, and $X_t$ is the chunk's time ordered data elements.

The system determines the solution of an optimization problem:

$$\min_{\theta, \phi} \sum_{t=1}^{N} Z_t^2,$$

$Z_t$ is an error term that satisfies: $Z_t = Y_t - F_t(\phi, \theta, \mu)$, and $\phi$, $\theta$, $\mu$ are the result data, i.e., the orders of the autoregressive, moving average, and integrated parts of the autoregressive integrated moving average.

The system also accesses a matrix A, which is a Jacobian matrix of the function to be minimized and is based in part on the obtained result data from the prior chunk, described above with reference to step 302. The matrix A can be represented by:

$$A = J^T J, \text{ where } J = (J_1, J_2, \ldots, J_N)^T$$

Determining J requires partial derivatives, $$J = (J_{t,\phi 1}, \ldots, J_{t,\phi 2}, \ldots, J_{t,\theta 1}, \ldots, J_{t,\theta 2}, \ldots, J_{t,\mu})^T,$$

$$J_{t,\phi i} = -\frac{\partial Z_t}{\partial \phi_i} = Y_{t-i} - \mu + \sum_{j=1}^{q} \theta_j J_{t-j,\phi_i}$$

$$J_{t,\theta i} = -\frac{\partial Z_t}{\partial \theta_i} = Z_{t-i} - \sum_{j=1}^{q} \theta_j J_{t-j,\theta_i}$$

-continued $$J_{t,\mu} = -\frac{\partial Z_t}{\partial \phi_i} = 1 - \sum_{j=1}^{p} \phi_j - \sum_{j=1}^{q} \theta_j J_{t-j,\mu}$$

The initial conditions are $J_{t,\phi i}=J_{t,\theta i}=J_{t,\mu}=0$ for $t\le p$, and $I=1, \ldots, p$; $j=1, \ldots, q$.

The system computes a delta, defined by: $\delta = (A + u \times \text{diag}(A))^{-1}g$, $g = J^T Z(\phi, \theta, \mu)$, $u = \tau \max_i(A_{i,t})$, and $\tau$ is a constant which can be a suitable values e.g., $10^{-2}$, $10^{-3}$. The system modifies the obtained result data by computing an addition of the obtained result data, obtained from the prior iteration of the previous chunk, with the delta:

$(\phi_{new}, \theta_{new}, \mu_{new}) = (\phi, \mu, \mu) + \delta$.

The system computes a constant $\rho$:

$$\rho = \frac{(\|Z(\phi, \theta, \mu)\|^2 - \|Z(\phi_{new}, \theta_{new}, \mu_{new})\|^2)}{\delta^T(u\delta + g)}$$

The system determines if $\rho$ is greater than zero, and if so sets the modified obtained result data as the current result data:

$(\phi, \theta, \mu) = (\phi_{new}, \theta_{new}, \mu_{new})$.

The system updates the variables $Z(\phi, \theta, \mu)$, the matrix A, $\rho$, and g using the modified obtained result data. The system also sets $u = u \times \max(\frac{1}{3}, 1-(2\rho-1)^3)$.

The system then begins a new iteration of the autoregressive integrated moving average.

If the system determines that $\rho$ is less than zero, it computes a multiplication of u with a constant, which in some implementations can be 2, or 3. In some implementations, the constant can increase by a factor of 2, or 3, each time the system determines that $\rho$ is less than zero.

The system stores the modified obtained result data from the iteration in the result data structure (step 306). The system stores the modified obtained result data, $(\phi, \theta, \mu)$, for that iteration in the result data structure mapped to a corresponding chunk identifier of the chunk.

The system determines whether any stopping criterion is satisfied (step 308). For example, the system can determine that $\delta$ is below a threshold difference, e.g., $10^{-14}$, $10^{-15}$, $10^{-16}$. Furthermore, the system can determine whether a maximum number of iterations has been reached. If the stopping criterion is satisfied, the system stops the computation; otherwise the system continues computing iterations.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:

assigning, to a respective segment node of a plurality of segment nodes of a distributed computing system, each chunk of a sequence of chunks of time series data elements arranged in a time ordering, wherein a first chunk in the time ordering is assigned to a first segment node and other chunks are assigned to a plurality of second segment nodes;

computing iteration result data for the time series data elements using an autoregressive integrated moving average (ARIMA) model comprising parameter values; and updating the parameter values of the ARIMA model, including:

obtaining, for each second segment node, prior iteration result data comprising autoregressive, integrated, and moving average values of the ARIMA model computed over a preceding chunk by a different segment node on a prior iteration, the preceding chunk being a chunk in the time ordering that precedes a respective chunk assigned to the second segment node, computing updated parameter values for the ARIMA model in accordance with the prior iteration result data, and computing, by each of the plurality of second segment nodes using the updated parameter values of the ARIMA model, current iteration result data of the ARIMA model for each chunk of the sequence of chunks assigned to the second segment node.

2. The method of claim 1, wherein computing the updated parameter values for the ARIMA model in accordance with the prior iteration result data comprises:

computing, by each of the plurality of second segment nodes at least partially in parallel, a delta value using the prior iteration result data and the current iteration result data; and using the delta value to update the parameter values of the ARIMA model.

3. The method of claim 2, wherein the method further comprises iteratively updating the parameter values of the ARIMA model until reaching a stopping criterion, wherein the stopping criterion corresponds to a determination that a difference between the delta value at a current iteration and the delta value at a previous iteration meets a predetermined threshold difference.

4. The method of claim 1, wherein updating the parameter values of the ARIMA model further comprises:

obtaining, by the first segment node assigned to process the first chunk, one or more initial conditions.

5. The method of claim 1, wherein computing the iteration result data comprises:
   initializing first values for the parameter values; and
   computing, by each segment node, respective iteration result data for each chunk assigned to the segment node using one or more specified initial conditions and the parameter values.

6. The method of claim 5, wherein the one or more specified initial conditions comprise random or zero values.

7. The method of claim 1, wherein the method further comprises:
   storing the iteration result data in a result data structure, wherein the result data structure maps result data to a respective chunk including a respective time series data element.

8. A system comprising:
   one or more computers and one or more storage devices on which are stored instructions that are operable, when executed by the one or more computers, to cause the one or more computers to perform operations comprising:
   assigning, to a respective segment node of a plurality of segment nodes of a distributed computing system, each chunk of a sequence of chunks of time series data elements arranged in a time ordering, wherein a first chunk in the time ordering is assigned to a first segment node and other chunks are assigned to a plurality of second segment nodes;
   computing iteration result data for the time series data elements using an autoregressive integrated moving average (ARIMA) model comprising parameter values; and
   updating the parameter values of the ARIMA model, including:
      obtaining, for each second segment node, prior iteration result data comprising autoregressive, integrated, and moving average values of the ARIMA model computed over a preceding chunk by a different segment node on a prior iteration, the preceding chunk being a chunk in the time ordering that precedes a respective chunk assigned to the second segment node,
      computing updated parameter values for the ARIMA model in accordance with the prior iteration result data, and
      computing, by each of the plurality of second segment nodes using the updated parameter values of the ARIMA model, current iteration result data of the ARIMA model for each chunk of the sequence of chunks assigned to the second segment node.

9. The system of claim 8, wherein computing the updated parameter values for the ARIMA model in accordance with the prior iteration result data comprises:
   computing, by each of the plurality of second segment nodes at least partially in parallel, a delta value using the prior iteration result data and the current iteration result data; and
   using the delta value to update the parameter values of the ARIMA model.

10. The system of claim 9, wherein the operations further comprise iteratively updating the parameter values of the ARIMA model until reaching a stopping criterion, wherein the stopping criterion corresponds to a determination that a difference between the delta value at a current iteration and the delta value at a previous iteration meets a predetermined threshold difference.

11. The system of claim 8, wherein updating the parameter values of the ARIMA model further comprises:
   obtaining, by the first segment node assigned to process the first chunk, one or more initial conditions.

12. The system of claim 8, wherein computing the iteration result data comprises:
   initializing first values for the parameter values; and
   computing, by each segment node, respective iteration result data for each chunk assigned to the segment node using one or more specified initial conditions and the parameter values.

13. The system of claim 12, wherein the one or more specified initial conditions comprise random or zero values.

14. The system of claim 8, wherein the operations further comprise:
   storing the iteration result data in a result data structure, wherein the result data structure maps result data to a respective chunk including a respective time series data element.

15. One or more non-transitory computer-readable storage media encoded with instructions that, when executed by one or more computers, cause the one or more computers to perform operations comprising:
   assigning, to a respective segment node of a plurality of segment nodes of a distributed computing system, each chunk of a sequence of chunks of time series data elements arranged in a time ordering, wherein a first chunk in the time ordering is assigned to a first segment node and other chunks are assigned to a plurality of second segment nodes;
   computing iteration result data for the time series data elements using an autoregressive integrated moving average (ARIMA) model comprising parameter values; and
   updating the parameter values of the ARIMA model, including:
      obtaining, for each second segment node, prior iteration result data comprising autoregressive, integrated, and moving average values of the ARIMA model computed over a preceding chunk by a different segment node on a prior iteration, the preceding chunk being a chunk in the time ordering that precedes a respective chunk assigned to the second segment node,
      computing updated parameter values for the ARIMA model in accordance with the prior iteration result data, and
      computing, by each of the plurality of second segment nodes using the updated parameter values of the ARIMA model, current iteration result data of the ARIMA model for each chunk of the sequence of chunks assigned to the second segment node.

16. The computer-readable storage media of claim 15, wherein computing the updated parameter values for the ARIMA model in accordance with the prior iteration result data comprises:
   computing, by each of the plurality of second segment nodes at least partially in parallel, a delta value using the prior iteration result data and the current iteration result data; and
   using the delta value to update the parameter values of the ARIMA model.

17. The computer-readable storage media of claim 16, wherein the operations further comprise iteratively updating the parameter values of the ARIMA model until reaching a stopping criterion, wherein the stopping criterion corresponds to a determination that a difference between the delta value at a current iteration and the delta value at a previous iteration meets a predetermined threshold difference.

18. The computer-readable storage media of claim 15, wherein updating the parameter values of the ARIMA model further comprises:
   obtaining, by the first segment node assigned to process the first chunk, one or more initial conditions.

19. The computer-readable storage media of claim 15, wherein computing the iteration result data comprises:
   initializing first values for the parameter values; and
   computing, by each segment node, respective iteration result data for each chunk assigned to the segment node using one or more specified initial conditions and the parameter values.

20. The computer-readable storage media of claim 19, wherein the one or more specified initial conditions comprise random or zero values.

21. The computer-readable storage media of claim 15, wherein the operations further comprise:
   storing the iteration result data in a result data structure, wherein the result data structure maps result data to a respective chunk including a respective time series data element.

\* \* \* \* \*